(12) United States Patent
Adams

(10) Patent No.: US 8,036,967 B2
(45) Date of Patent: Oct. 11, 2011

(54) BANK CARD FRAUD DETECTION AND/OR PREVENTION METHODS

(75) Inventor: Dean A. Adams, Winston-Salem, NC (US)

(73) Assignee: Allegacy Federal Credit Union, Winston-Salem, NC (US)

( * ) Notice: Subject to any disclaimer, the term of this patent is extended or adjusted under 35 U.S.C. 154(b) by 412 days.

(21) Appl. No.: 11/955,482

(22) Filed: Dec. 13, 2007

(65) Prior Publication Data

US 2008/0172316 A1    Jul. 17, 2008

(51) Int. Cl.
*G06Q 40/00* (2006.01)
(52) U.S. Cl. ......................................................... 705/35
(58) Field of Classification Search .................... 705/35
See application file for complete search history.

(56) References Cited

U.S. PATENT DOCUMENTS

| | | |
|---|---|---|
| 5,852,811 A | 12/1998 | Atkins |
| 5,884,289 A | 3/1999 | Anderson et al. |
| 5,987,140 A | 11/1999 | Rowney et al. |
| 6,094,643 A * | 7/2000 | Anderson et al. ............... 705/44 |
| 6,205,437 B1 | 3/2001 | Gifford |
| 6,330,546 B1 | 12/2001 | Gopinathan et al. |
| 7,617,133 B1 * | 11/2009 | Antony et al. ............... 705/26.7 |
| 2002/0156724 A1 | 10/2002 | Levchin et al. |
| 2002/0161701 A1 | 10/2002 | Warmack |
| 2002/0169717 A1 | 11/2002 | Challener |
| 2003/0233327 A1 | 12/2003 | Keresman, III et al. |
| 2004/0128195 A1 | 7/2004 | Sorem |
| 2004/0177035 A1 | 9/2004 | Silva |
| 2006/0064380 A1 | 3/2006 | Zukerman |
| 2006/0080230 A1 | 4/2006 | Freiberg |
| 2009/0048934 A1 * | 2/2009 | Haddad et al. .................. 705/17 |

FOREIGN PATENT DOCUMENTS

WO    WO 03038666    5/2003

OTHER PUBLICATIONS

Felix, June; "Fighting Bank Fraud With a Strong Defense"; USBanker, V114n11, pp. 72, Nov. 2004, ISSN: 0148-8848.*
Business Wire; "Sucess with Falcon Solution Prompts Sears to Renew Agreement With HNC Software; Premier Retail Card Issuer to Expand Falcon System's Use"; p. 0447; Jul. 31, 2000; Supplier No. 63753511.*
Business Wire; "Retail Decisions to Provide Internet Fraud Prevention Services for Leading Telephony Company, DotCom Technologies", May 9, 2000.*

* cited by examiner

*Primary Examiner* — Alexander Kalinowski
*Assistant Examiner* — Edward Chang
(74) *Attorney, Agent, or Firm* — Spilman Thomas & Battle, PLLC

(57) ABSTRACT

Bank card fraud detection and/or prevention methods can generally involve determining a common point of compromise and/or identifying merchants associated with bank card transaction frequencies which exceed a predetermined threshold value which is indicative of potentially fraudulent bank card activity. These methods can further involve identifying other bank cards used at the common point of compromise.

18 Claims, 5 Drawing Sheets

BANK CARD FRAUD DETECTION AND/OR PREVENTION METHODS

BACKGROUND

The method described herein relates to methods for detecting credit/debit card fraud. Plastic card fraud is a costly problem, some recent reports state that there have been more than $236 million in losses in the past three years, $100 million in 2005 alone. Reportedly, losses in 2006 are already ahead of last year's pace, and the worst may be yet to come. The rising tide of plastic card fraud losses threatens to wash away the ability of credit unions to provide competitive card programs for their members. Closing security breaches is a top priority, but the criminal minds perpetrating these acts of thievery on unsuspecting individuals and businesses are resilient, resourceful and relentless. Reports further indicate that while credit card fraud continues to grow, recent major breaches have also involved debit cards. The theft of debit and credit card information from databases at nationally known retailers have recently received wide spread publicity. It has been reported that breaches at major retailers earlier this year resulted in hundreds of thousands of compromised accounts, resulting fraudulent transactions and the expense of blocking and reissuing of thousands of debit and credit cards. The consequences are costly. When informed of the breaches, financial/banking institutions scramble to either closely monitor compromised card accounts for fraud, or cancel them and reissue new cards with new account numbers. Replacing plastic cards is a painstaking and expensive process costing institutions as much as twenty-five dollars, or more, per card. Increased losses may lead to a tarnished reputation. In addition to millions of dollars in expenses, card-issuers are left to address the questions, concerns, and fears of angry card holders. Even though card issuers are not responsible for the breaches, each breach undermines the relationship between the issuer and the card holder. Relationships that have taken years to nurture can quickly sour when card holders are at risk of becoming fraud victims or having their identity stolen.

Therefore, there is a need for a method for detecting credit/debit card fraud, such as will be described in more detail below.

SUMMARY

Bank card fraud detection and/or prevention methods as described herein can generally comprise determining "a common point of compromise," and then using that information to prevent further fraud. A plurality of different methodologies can be employed in the fraud detection and/or prevention methods. These methodologies can comprise "card number lookup," "merchant name reverse lookup," and "merchant frequency," and combinations thereof.

An embodiment of a bank card fraud detection and/or prevention method can generally comprise identifying bank cards which are known or suspected to be associated with fraudulent charges, and determining a common point of compromise, wherein this common point of compromise is a merchant at which at least some of the plurality of bank cards were each used. A particular method for determining a common point of compromise can comprise the aforesaid card number lookup method. An embodiment of the card number lookup method can generally comprise searching a bank card database using the bank card numbers which are known or suspected to be associated with the aforesaid fraudulent charges to identify a merchant at which each of the bank cards were used. The card number lookup search can further comprise using a query which specifies a certain date range within which all of the compromised bank cards were used at a common merchant, which merchant can be the common point of compromise. It is further contemplated that there may be a plurality of common points of compromise, wherein each common point of compromise could correspond to a different merchant at which multiple ones of the plurality of known or suspected fraudulent bank cards were used.

Further embodiments of the bank card fraud detection and/or prevention methods can comprise, subsequently to determining the common point of compromise, identifying other bank cards which were used at the same merchant. These other bank cards, by virtue of having been used at the common point of compromise, are thus also potentially compromised even though no fraudulent charges may have yet been reported with respect to these bank cards. A method of identifying these other potentially compromised bank cards can more particularly comprise the aforesaid merchant name reverse lookup method.

An embodiment of the merchant name reverse lookup method can generally comprise searching the bank card database using a query based upon the name of a merchant identified as being a common point of compromise. Similarly to the card number lookup search, the merchant name reverse lookup search can be used to identify any other bank cards that were used at the same merchant. The merchant name reverse lookup search can also similarly utilize a query which specifies a certain date range within which other bank cards were used at the same merchant, i.e., common point of compromise. A list of these other potentially compromised bank cards can be generated, and the list can be provided to the appropriate financial institutions and legal and/or regulatory authorities such that appropriate action can be taken to prevent fraudulent use thereof. For example, the other potentially compromised bank cards can be deactivated to prevent future fraudulent use, and new bank cards can be issued, if desired, to replace the deactivated ones.

Another embodiment of a bank card fraud detection and/or prevention method can generally comprise the aforesaid merchant frequency method. An embodiment of the merchant frequency method can generally comprise identifying a first merchant associated with bank card transaction frequencies which exceed a predetermined threshold value indicative of potentially fraudulent bank card activity; identifying a first plurality of bank cards used at the first merchant associated with the transaction frequencies which exceed the threshold value; from the first plurality of bank cards, identifying a second plurality of bank cards which have charge reversals; and then determining the common point of compromise. The first merchant identified can be a test site, and the common point of compromise can be the second merchant, at which at least some of the second plurality of bank cards were used. Identifying bank card transaction frequencies which exceed a predetermined threshold value can further comprise searching a bank card database using a bank card transaction frequency query. The bank card transaction frequency query can be based upon exceeding a certain threshold value over a predetermined time interval. The time interval can be, for example, a single day, and the specified transaction frequency can be one percent (1%) of all bank card transactions during the single day.

Determination of the common point of compromise can comprise using the aforesaid card number lookup method, wherein it is the second plurality of bank cards which is utilized to identify the second merchant, i.e., the common point of compromise. Moreover, the aforesaid merchant name reverse lookup method can likewise be used to identify other bank cards used at the second merchant identified as the common point of compromise. Additionally, a list of all potentially compromised bank cards, e.g., bank cards used at the first and/or second merchants, can be provided to the appropriate financial institutions and legal and/or regulatory authorities such that further action can be taken to prevent fraudulent use thereof. For example, all of the potentially compromised bank cards can be deactivated, and new bank cards can be issued to replace the deactivated ones, if desired.

To the accomplishment of the foregoing and related ends, certain illustrative aspects of the bank card fraud detection and/or prevention method are described herein in connection with the following description and the appended drawings. These aspects may be are indicative of but a few of the various ways in which the principles of the bank card fraud detection and/or prevention method may be employed, and which is intended to include all such aspects and any equivalents thereof. Other advantages and features of the bank card fraud detection and/or prevention method may become apparent from the following detailed description when considered in conjunction with the drawings.

BRIEF DESCRIPTION OF THE DRAWING FIGURES

A more complete understanding of the bank card fraud detection and/or prevention method described herein can be obtained by considering the following description in conjunction with the accompanying drawing figures in which.

DETAILED DESCRIPTION OF CERTAIN EMBODIMENTS

Figure 1:
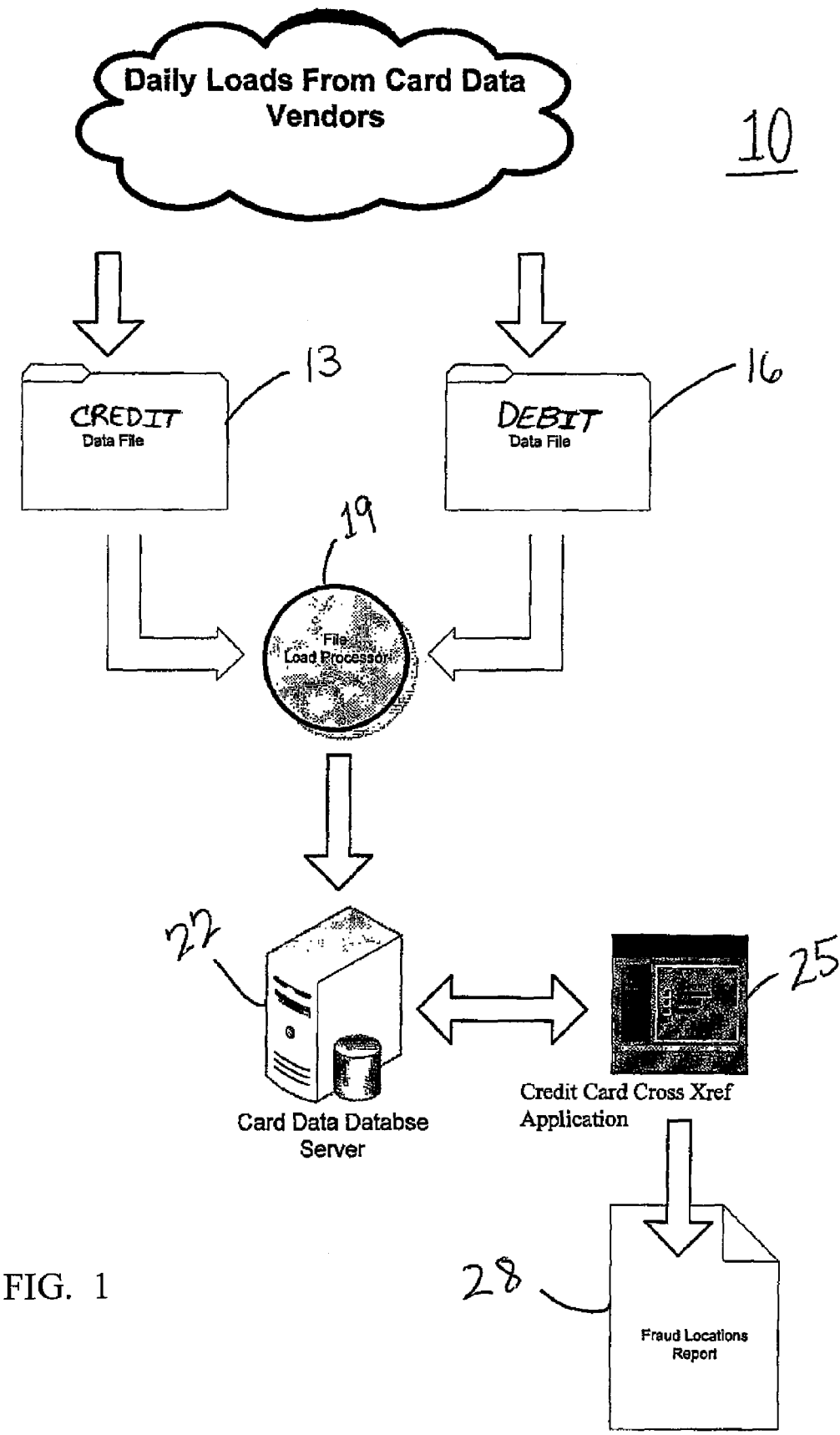
FIG. 1 is a high level diagram of an embodiment of the bank card fraud detection and/or prevention method.

Typically, bank card data will be stolen from a merchant, which merchant will be termed a "common point of compromise," and used to create fraudulent bank cards. Of course, there can be more than one merchant/common point of compromise. The fraudulent bank cards will often later be tested at a what is commonly referred to as a "test site," in order for the perpetrator to determine whether the fraudulent bank cards will work, before such cards are used, or sold. The common point of compromise can usually be a large retailer, but the common point of compromise need not be the test site, although it could be the test site. According to the methods described herein, a test site can be detected by unusually high bank card transaction frequencies, and particularly such transactions as are associated with charge reversals. The charge reversals prevent the charges from ever getting to a posting file. A posting file is the actual file that money is transacted on, and will show up on a client's statement. Thus, a perpetrator testing the fraudulent bank cards will typically make a charge and then do an immediate reversal, because they are only testing to see if the card works, and do not yet want any charge to show up on the account. However, the actual test site could be a large retailer, so it is important to note that some of the charge reversals may be in fact be legitimate, which complicates determining what is a test site and what is the common point of compromise.

The bank card fraud detection and/or prevention method is now described with reference to the drawings, wherein like reference numerals are used to refer to like elements throughout. In the following description, for purposes of explanation, numerous specific details are set forth in order to provide a thorough understanding of the bank card fraud detection and/or prevention method. It may be evident to one skilled in the art that the bank card fraud detection and/or prevention method may be practiced without these specific details. In other instances, well-known structures and/or devices may be shown in block diagram form in order to facilitate description of the bank card fraud detection and/or prevention method.

The term "bank card," or simply "card," as used herein is to be understood to refer to either, or both, of a credit card or a debit card. Furthermore, "bank card" is to be understood to not be limited to only credit or debit cards issued by a "bank," but shall be understood to refer to such cards as issued by any type of financial institution, and shall further be understood to include department store credit cards and the like.

The term "computer readable medium" as used herein shall be understood to refer to any kind of computer memory, such as floppy disks, conventional hard disks, CD-ROMS, Flash ROMS, nonvolatile ROM, RAM, and the like, including any type of computer memory which may be later developed.

Referring now to the drawing figures, FIGS. 1 through 5 contain diagrams which illustrate exemplary embodiments of the bank card fraud detection and/or prevention methods described herein.

System Overview

FIG. 1 illustrates a system 10 for carrying out a bank card fraud detection and/or prevention method is illustrated that can enable fraud investigators to determine where fraudulent cards were compromised, stolen, and/or tested. The system 10 can generally comprise computer software and associated hardware for implementing the bank card fraud detection and/or prevention method. The system 10 can be configured to receive data daily from multiple credit card 13 and debit card 16 networks, such as from banks/financial institutions, i.e., the "daily loads from card data vendors" 17. A Windows service, e.g., the illustrated "file load processor" 19 can be created to allow the banks/financial institutions to load the common elements from each file and load all transactions in a common database, for example Card Data Database 22. Loader application code can be developed for the file load processor 19 to take the daily feeds from the bank card data vendors, extract specific data, and load it into the database 22. This can eliminate a step that would otherwise require a person to manually feed the necessary information into the card data database 22. An exemplary embodiment of loader application code is set forth in Appendix A.

An application 25, for example a Windows application, can be developed, e.g., in .NET, to allow fraud investigators to determine a common point of comprise for known or suspected fraudulent cards, and/or to detect potential "test sites" for fraudulent cards in order to prevent bank card fraud before it occurs. The application 25 can be used to generate a report 28 showing the original point of comprise that was determined for the given known fraudulent cards. The application 25 can also be utilized to identify every card that was used at the common point of compromise so that the bank/financial institution can take proactive action to block to fraudulent cards. In this way, fraud can be stopped before it becomes too widespread, which will thus save the bank/financial institution money by stopping further losses from fraudulent transactions before they occur.

Card Database Layout

The card database server 22 can combine all of the fields from daily feeds into one database. This database can hold/store all of the bank card transactions. The following is a non-exhaustive list of fields, by way of example only, which are presently contemplated to be provided in the database 22:
- TransactionID;
- *TranDetailID;
- TranTyp;
- CardNumber;
- Merchant Name;
- Merchant Address;
- Merchant City;
- Merchant State;
- Merchant Zip;
- Transaction Amount
- Transaction Date.
  - *Non standard fields can be held in a Transaction Detail Table. This will allow the system to store information specific to a feed or client. Additional fields may also be used.

Load Process

The load process can be a Windows service that will watch for files in a given directory. The load processor 19 presently contemplated can support, for example, the STAR recon file and Certegy Standard file formats. Additional card processors can be supported as required by the user.

The load process will read in the files and put the common fields into the Card Data database 22. Fields not in the common set fields can be stored in a "transaction detail" table. These tables can be specific to a feed or client data.

Notifications can be sent to make users aware of the success or failure of the load. The Windows service can be integrated in an "event log and performance monitor" so that IT support personnel can view the load process in real time.

Application Features

The presently contemplated application 25 can have several features to simplify the detection of fraudulent transactions. These features can include to following non-exhaustive list, by way of example only:
1. users can generate a report to show a common point of comprise;
2. end users can enter a range of bank card numbers to determine where all the bank cards where used (to determine a common point of compromise);
3. view data load notifications;
4. fix data errors in the load;
5. lookup bank cards by merchant name;
6. search on all imported bank card data sources; and
7. generate a merchant frequency list—showing the percentage of all daily transactions for which a particular merchant was used.

Some known methods directed at detecting or preventing bank card fraud can use multiple databases of multiple financial institutions (bank card issuers). The type of bank card fraud detection and/or prevention method described herein allows for a single bank/financial institution to use and stop fraud which affects their customers, which also differentiates the present method from some other known methods. Moreover, no third party communications have to take place in order for the present method to be utilized. However, the present method can also be expanded to incorporate multi financial institutions, if desired.

The present method also recognizes and can account for the fact that all bank card processors do not typically provide the same data in their daily feeds. For example, some banks/financial institutions use different vendors for credit card transactions than for debit card transactions, and thus the data might look different. As an example, the credit side might show Wal-Mart™ 132, whereas the debit side might just show Wal-Mart™. Alternatively, the credit side might show Wal-Mart™ and the debit side might only give an address. To combat such differences, the application 25 can run multiple queries at the same time and produce a report. Also, the application 25 can take an address showing and compare it to known matching locations contained in the database and possibly give a matching name. This can avoid the investigator having to research the address. The multiple queries can be, for example, as follows:
1. all cards against the entire database;
2. all cards against the credit transactions;
3. all cards against the debit transactions;
4. debit Cards against Credit transactions (A debit card can be used as a credit or a PIN may be required;)
5. debit Cards against Debit transactions;
6. credit Cards against Credit transactions; and
7. credit Cards against Debit transactions (Unlikely, unless someone is using a credit card at an ATM or getting a cash advance at a bank).

An example is that the result of item number 4 (60%) added to the result of item number 3 (40%) is equal to 100%.

The foregoing can be very important because, for example, a majority of credit unions use different vendors for their debit and credit transactions. Most large debit/PIN compromises can typically all be in one database, but credit unions will need the capability to view/analyze the different scenarios.

Bank Card Fraud Detection and/or Prevention Methods

An embodiment of the bank card fraud detection and/or prevention method can generally comprise identifying a common point of compromise, wherein the common point of compromise is one or more merchants at which at least some of the plurality of bank cards were each used, and identifying other bank cards used at the common point of compromise so as to inform of all potentially compromised bank cards.

Card Number Lookup Method

To determine a common point of comprise an end user will enter in a range of credit\debit cards numbers. Fraudulent charges can be reported by, for example, the bank/financial institution customers or VISA CAMS reports. The system can determine which cards all used the exact same merchant during a given date range. If there is a merchant with a 100% match, that merchant is the common point of compromise.

As an example, once a CAMS report is issued, the bank cards needed to be blocked have already been determined by VISA. VISA has already pulled the compromised cards from the merchant and are letting the financial institutions know through the CAMS report. However, it is preferable not to have to depend or wait upon the CAMS report, because by the time it is issued the bank/financial institution could have already lost a large amount of money to the fraud. The method described herein permits the bank/financial institution to identify the fraud even before such a CAMS report may be issued. If you are one of the original bank/financial institution that is having their BIN's hit, the CAMS report can be of little or no help. Rather, the CAMS report helps those that are one of the early institutions getting hit by the criminals.

Determining the common point of compromise can more particularly comprise a card number lookup method, an embodiment of which can comprise searching a bank card database using the bank card numbers which are known or suspected to be associated with fraudulent charges in order to determine the common point of compromise. The card number lookup search can further comprise using a query which specifies a certain date range within which all of the bank cards were used at the common merchant, i.e., common point of compromise. It is possible that there may be a plurality of common points of compromise, wherein each common point of compromise could correspond to a different merchant at which multiple ones of the plurality of known or suspected fraudulent bank cards were used.

Figure 2:
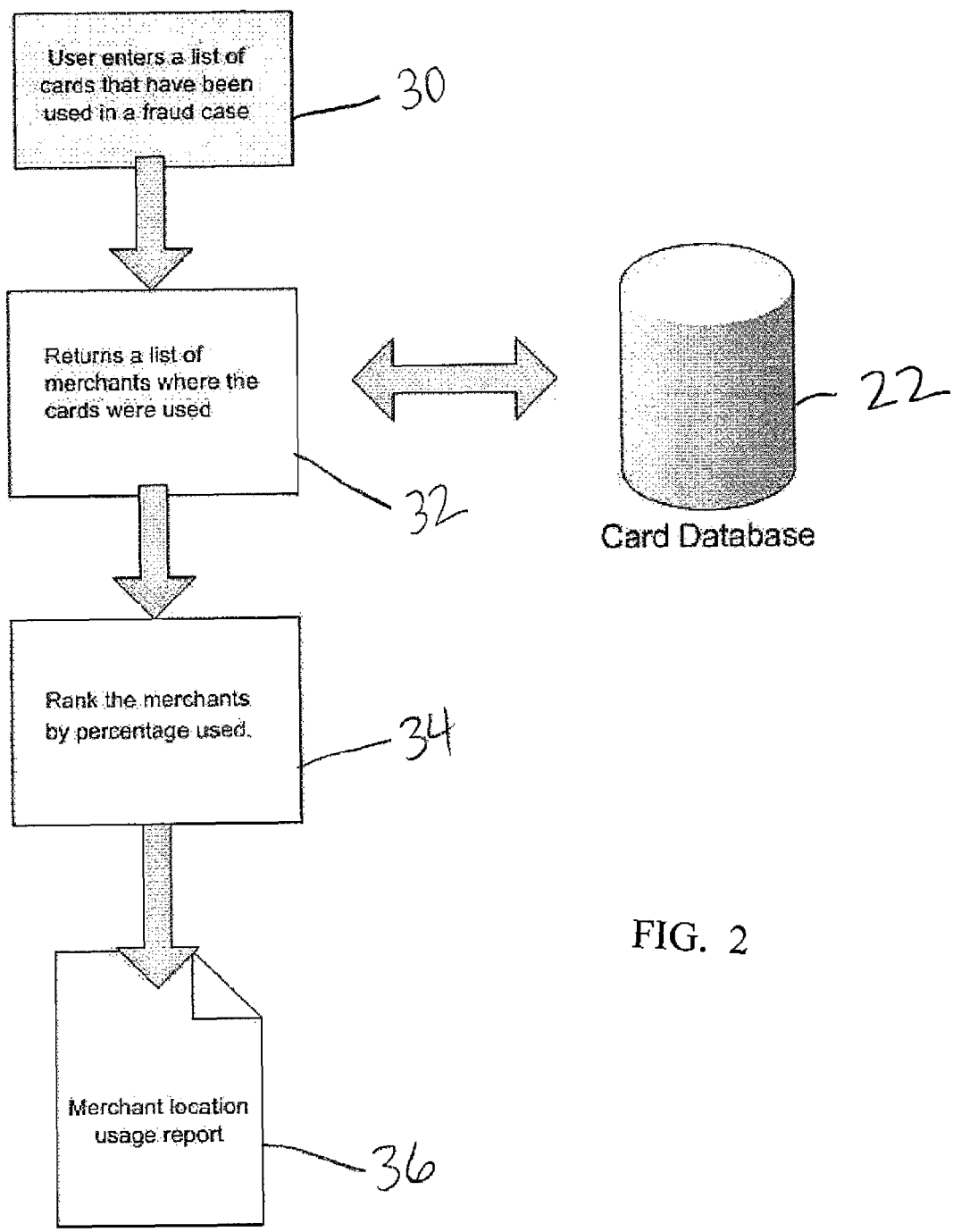
FIG. 2 is a diagram of an embodiment of a card number look-up method.

FIG. 2 illustrates a high level flow diagram of an embodiment of a card number lookup method, wherein at block 30 the user enters a list of bank card numbers that have been used in a fraud case. At block 32 the program returns a list of merchants where these bank cards were used. This step involves communication with the bank card database 22, and in particular involves searching the bank card database using the list of bank card numbers returned at block 32 to identify at which merchant, or merchants, the listed bank card numbers were used. At block 34 the program ranks the identified merchants by percentage used, and at block 36, the program can generate a merchant location usage report.

Embodiments of the bank card fraud detection and/or prevention method using the card number lookup method can further comprise identifying other bank cards which were used at the same merchant, or merchants, identified as being a common point of compromise. These other bank cards, simply by virtue of having been used at a common point of compromise, are potentially compromised even though no fraudulent charges have yet been reported with respect to these cards. Identifying these other potentially compromised bank cards can more particularly comprise a merchant name reverse lookup method, as will be described in more detail hereinafter.

The methods described herein can typically be implemented by a computer, and the invention thus contemplates a computer readable medium containing instructions for performing the various embodiments described herein. In this regard, an embodiment of a computer-readable medium having computer-executable instructions for performing a card number lookup method to determine a common point of compromise can generally comprise instructions for searching a bank card database using a query based upon a plurality of bank card numbers which are suspected or known to be associated with fraudulent charges; instructions for determining at least one common point of compromise at which a plurality of the bank cards where used, wherein the at least one common point of compromise corresponds to a merchant. The instructions for determining the common point of compromise can further comprise instructions for specifying a date range within which the potentially compromised bank cards were used at the common point of compromise. The common point of compromise can potentially be a plurality of common points of compromise, wherein each of the plurality of common points of compromise can correspond to a merchant at which a plurality of the bank cards were used. An exemplary embodiment of a card number lookup application code can be as set forth in Appendix B.

Further embodiments of a bank card fraud detection and/or prevention method used in combination with the card number lookup method can comprise instructions for identifying other bank cards used at the merchant, or merchants if more than one common point of compromise is identified, wherein such other bank cards are potentially compromised. The method can further comprise instructions for generating a list of all the potentially compromised bank cards which can be provided to the appropriate financial institutions and legal and/or regulatory authorities such that appropriate action can be taken to prevent fraudulent use thereof. Such action can include deactivating the bank cards on the list of potentially compromised bank cards, and issuing new bank cards to replace the deactivated ones, if desired.

Merchant Name Reverse Lookup Method

If a list of known fraudulent cards all used a single merchant during the same date range, then that merchant is probably the common point of compromise. Once the origin point is determined, the investigator can query the data with the merchant name, i.e., a merchant name reverse lookup. This query will generate a list of all bank cards that were used at this same merchant. The query can also more particularly identify of all bank cards which were used at the common point of compromise during a specified date range. This will give the bank/financial institution a list of all of the bank cards that are potentially comprised. In order to be proactive, the bank/financial institution can block all of these cards and issue new cards.

The merchant name reverse lookup can typically be utilized in combination with a method of determining the common point of compromise, such as the card number lookup method described previously. An embodiment of a merchant name reverse lookup method can comprise searching the bank card database using the name of the merchant, or merchants, identified as, for example, a common point of compromise. This search can identify any other bank cards that were also used at the same merchant. The merchant name reverse lookup search can, similarly to the card number lookup search, utilize a query which specifies a certain date range within which other bank cards were used at the same merchant(s). A list of these other potentially compromised bank cards can be generated, and the list can be provided to the appropriate financial institutions and legal and/or regulatory authorities such that appropriate action can be taken to prevent fraudulent use thereof. For example, the other potentially compromised bank cards can be deactivated to prevent future fraudulent use, and new bank cards can be issued, if desired, to replace the deactivated ones.

Figure 3:
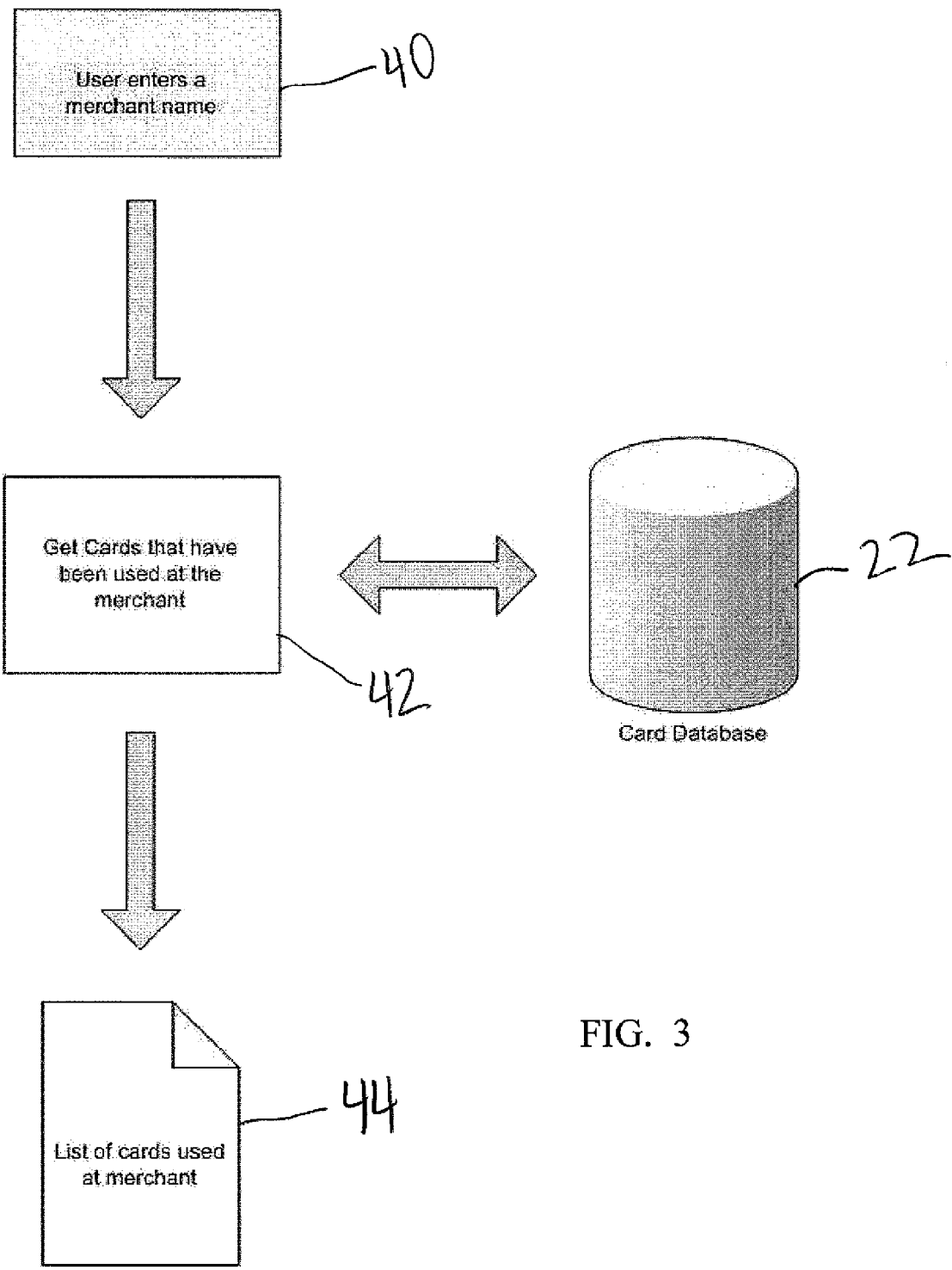
FIG. 3 is a diagram of an embodiment of merchant name reverse look-up method.

FIG. 3 illustrates a high level flow diagram of an embodiment of a merchant name reverse lookup method is diagrammatically illustrated, wherein at block 40 the user enters a merchant name, such as the name of a merchant identified as a potential common point of compromise. At block 42, the program searches the bank card database 22 and identifies bank cards that have been used at the specified merchant. At block 44, the program generates a list of other bank cards which have been used at the specified merchant. These other bank cards are those which are at risk of being compromised as a result of having been used at a merchant identified as a potential common point of compromise.

As explained above, the methods described herein can typically be implemented by a computer, and thus the invention contemplates a computer readable medium having computer-executable instructions for performing a bank card fraud detection and/or prevention method further utilizing a merchant name reverse lookup method as just described can generally comprise instructions for identifying the other potentially compromised bank cards. The instructions can further comprise instructions for searching the bank card database using a query based upon the merchant to identify the other bank cards which were used at the merchant. The instructions for identifying the other potentially compromised bank cards can further comprise instructions for specifying a date range within which the other bank cards were used at the common point of compromise. The common point of compromise can be a plurality of common points of compromise, wherein each of the plurality of common points of compromise corresponding to a merchant at which a plurality of the bank cards were used, and the instructions can be for identifying other bank cards used at the each of the plurality of common points of compromise. An exemplary embodiment of merchant name reverse lookup application code can be as set forth in Appendix C.

Figure 4:
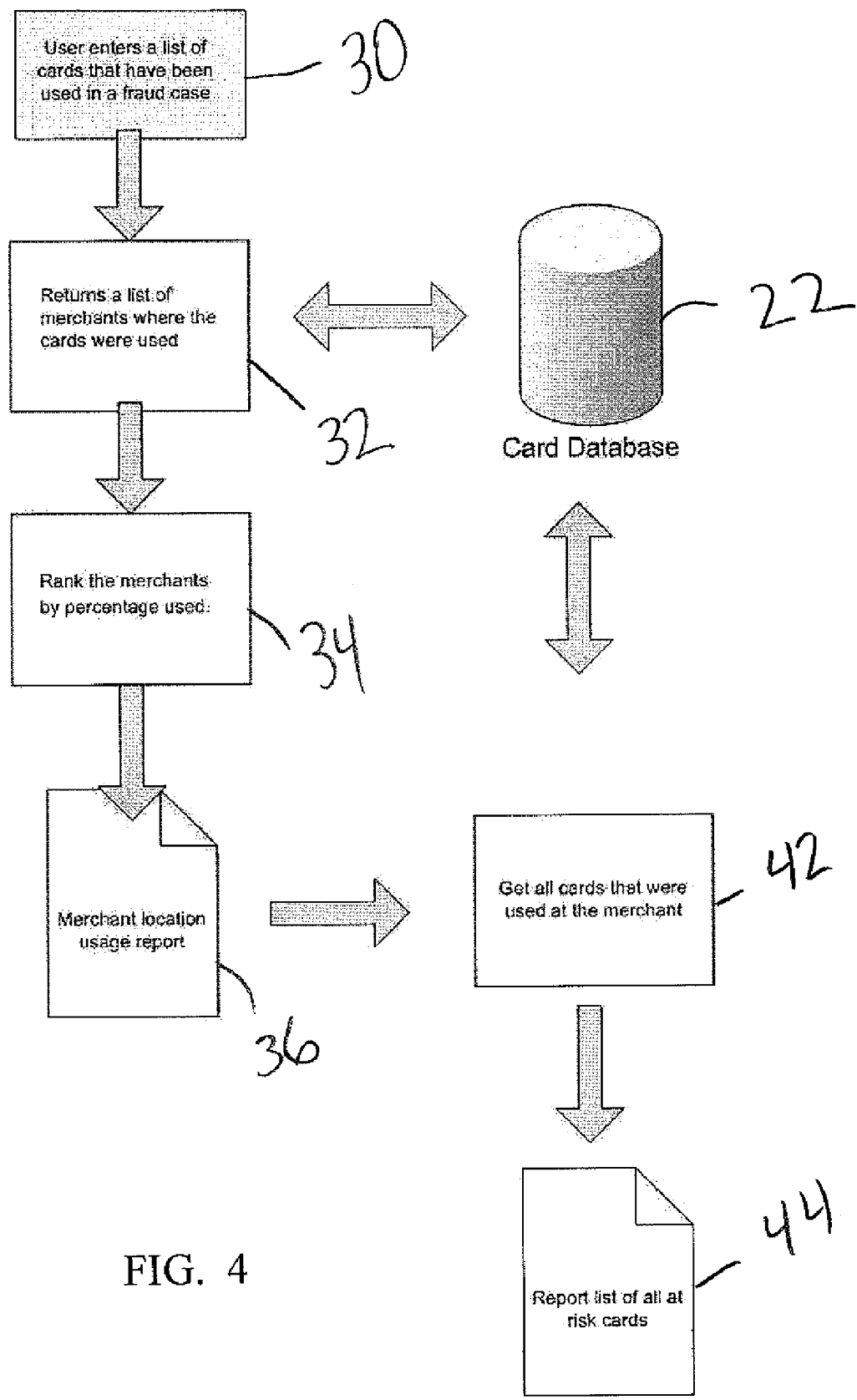
FIG. 4 is a diagram of an embodiment of a combined card number look-up and merchant name reverse look-up method.

FIG. 4 illustrates a high level flow diagram of an embodiment of a combined card number lookup and merchant reverse name lookup method. As mentioned above, the merchant reverse name lookup method can be used in combination with the card number lookup method, n order to identify other bank cards used at the common point of compromise. In the illustrated embodiment, the methods described separately for the card number lookup and merchant reverse name lookup methods can essentially be the same, just combined together, with the merchant name reverse lookup method added on to the card number lookup method in order to identify other bank cards used at the common point of comprised that is identified by the card number lookup method. Referring to the diagram, at block 30 the user enters a list of bank card numbers that have, for example, been used in a fraud case. At block 32 the program returns a list of merchants where these bank cards were used. This step involves communication with the bank card database 22, and in particular involves searching the bank card database 22 using the list of bank card numbers input at block 30. At this step, a merchant, or merchants, are identified at which the listed bank card numbers were used. At block 34 the program ranks the identified merchants by percentage used, and at block 36 the program creates a merchant location usage report. Next, the merchant name reverse lookup method can be implemented, in which the merchant name generated at block 36, specifically the name of a merchant identified as a potential common point of compromise, is utilized as input for block 44. At block 44 the program searches the bank card database 22 and identifies other bank cards that have been used at the merchant identified at block 36. At block 44, the final step can be generating the list of other bank cards which have been used at the specified merchant. These bank cards are at risk of being compromised as a result of having been used at a merchant identified as a potential common point of compromise.

Merchant Frequency Method

This step allows the investigator to look at all of bank card transactions, e.g., occurring on a daily basis. Merchant frequency shows investigators what percentage of all transactions involved the use of a particular merchant. Custom threshold values can be set to filter the list. For example if a one (1) percent threshold value is set, the merchant frequency will show all merchants who have transactions that make up more than one (1) percent of all of the daily transactions. High frequency percentage values during one given day can point to a potential fraud before it takes place. A first merchant(s) thus identified is not necessarily a "common point of compromise," and in fact is more likely to be the previously described "test site," whereat the perpetrator is checking to see if the fraudulent bank cards actually work before selling the fraudulent cards or trying to conduct a large number of fraudulent transactions using such cards. The common point of compromise is usually a large retailer, but often is not the test site, although it could possibly turn out to be the same merchant as the test site. Often, bank card data will be stolen from the "common point of compromise," and the bank card data will later be "tested" at the test site to determine if the bank cards work.

From the bank card numbers identified as being associated with the first merchant, the investigator can select, e.g., randomly, a series of these bank card numbers that show charge reversals. These are the bank cards that are potentially being tested. The charge reversals prevent the charges from ever getting to a posting file. A perpetrator who is testing the bank card numbers will make a charge and then do an immediate reversal, because they are only testing to see if the bank card works, and don't want any charge to show up on the account yet. Because the test site could be a large retailer, it is important to note that some of the charge reversals that can be indicative of a test site may in fact be legitimate, even if others are not. After selecting a series of the bank card numbers that show charge reversals, such numbers are entered into the system to identify a second merchant at which all of these bank cards have been used. This second merchant can be the common point of compromise. The common point of compromise can be determined using the aforesaid card number look up method. After the common point of compromise is identified, the merchant name reverse lookup method can also be utilized to identify all potentially compromised bank cards. Therefore, the merchant frequency method is a proactive method that allows investigators to prevent fraud instead of simply reacting to fraud, as is conventionally done.

Figure 5:
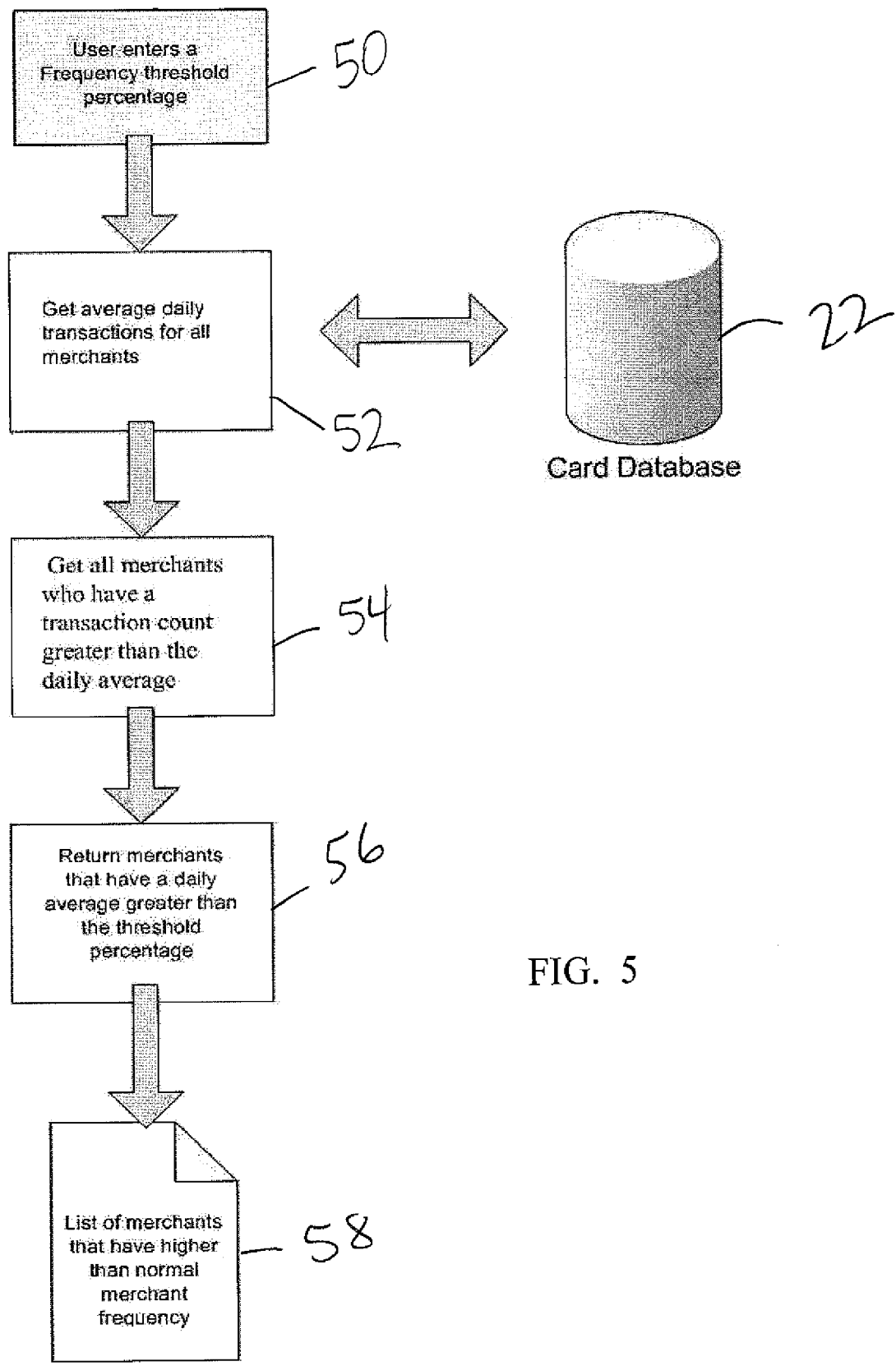
FIG. 5 is a diagram of an embodiment of a merchant frequency identification method.

FIG. 5 illustrates a high level flow diagram of an embodiment of a merchant frequency method for identifying merchants that have a higher than normal transaction frequency. In particular, at block 50 the user enters a predetermined transaction frequency threshold percentage, which is selected as being indicative of potentially fraudulent activity. In general, the threshold percentage can be indicative of the merchant being a test site for fraudulent bank cards. At block 52 the program searches the bank card database 22 and gets average daily transactions for all merchants. At block 54 the program identifies all merchants which have a transaction count greater than the daily average. At block 56 the program identifies merchants that have a daily average greater than the threshold percentage. At block 58 the program can generate a list of merchants that have higher than normal merchant frequency, and such as merchants that have a transaction frequency greater than the threshold percentage.

An embodiment of a merchant frequency method can generally comprise identifying a first merchant(s) associated with a bank card transaction frequency indicative of fraudulent bank card activity; identifying a second merchant(s), which can be a common point of compromise. After the first merchant is identified, which can be a test site, the common point of compromise, i.e., the second merchant, can be determined using the aforesaid card number lookup method. As explained above, the first merchant can be often be different from the second merchant, although they could be the same. The merchant frequency method can further comprise identifying a first merchant associated with bank card transaction frequencies which exceed a predetermined threshold value, which threshold value is indicative of potentially fraudulent bank card activity; identifying a first plurality of bank cards used at the first merchant associated with the transaction frequencies which exceed the threshold value; from the first plurality of bank cards identifying a second plurality of bank cards which have charge reversals; and using the second plurality of bank cards to determine the common point of compromise, wherein the common point of compromise is a second merchant at which at least some of the second plurality of bank cards were used. Identifying bank card transaction frequencies which exceed a predetermined threshold value can further comprise searching a bank card database using a bank card transaction frequency query. The bank card transaction frequency query can be based upon exceeding a certain threshold value over a predetermined time interval. The time interval can be, for example, a single day, and the specified transaction frequency can be, for example, one percent (1%)

of all bank card transactions during the single day. Determination of the common point of compromise can generally involve using the previously described card number lookup method, wherein the second plurality of bank cards is utilized to identify the second merchant(s), i.e., the common point of compromise.

After determining the common point of compromise, i.e., second merchant, other bank cards used at the second merchant can be identified, e.g., by using the aforesaid merchant name reverse lookup method. Additionally, other bank cards used at the first merchant, which could be a test site, can similarly be identified using the merchant name reverse lookup method, such that all potentially compromised bank cards can be identified. All of these other bank cards are potentially compromised by virtue of being used at a common point of compromise and/or a potential test site. Thus, a list of all potentially compromised bank cards, e.g., used at either the first or second merchants, can be generated and provided to the appropriate financial institutions and legal and/or regulatory authorities such that further action can be taken to prevent fraudulent use thereof. For example, all bank cards on the list of potentially compromised bank cards can be deactivated and new bank cards to replace the deactivated ones, if desired.

Similarly to the card number lookup method previously described, the methods described herein can typically be implemented by a computer, and thus the invention contemplates a computer readable medium containing instructions for performing the various embodiments described herein. For example, a computer-readable medium having computer-executable instructions for performing a bank card fraud detection and/or prevention method using a merchant frequency method as just described can generally comprise searching a bank card database using a bank card transaction frequency query to identify a first merchant associated with bank card transaction frequencies which exceed a predetermined threshold value which is indicative of potentially fraudulent bank card activity; searching the bank card database using a query based upon the first merchant to identify a first plurality of bank cards used at the first merchant; from the first plurality of bank cards, identifying a second plurality of bank cards which have charge reversals; and searching the bank card database using a query based upon the second plurality of bank cards to determine a common point of compromise, wherein the common point of compromise is a second merchant at which at least some of the second plurality of bank cards were used. The bank card transaction frequency query can be based upon exceeding the threshold value over a predetermined time interval, wherein the time interval is a single day. The transaction frequency can be one percent (1%) of all bank card transactions during the single day. An exemplary embodiment of merchant frequency application code can be as set forth in Appendix D.

The previously described card number lookup method can be utilized as part of the merchant frequency method, to determine the common point of compromise using the Additionally, the merchant name reverse lookup method can also be used subsequent to identifying the first and/or second merchants. Thus, an embodiment of the combined method can further comprise instructions for searching the bank card database using a query based upon the second merchant; and identifying other bank cards used at the second merchant, wherein such other bank cards are potentially compromised. If desired, the method can also comprise instructions for searching the bank card database using a query based upon the first merchant; and identifying other bank cards used at the first merchant, wherein such other bank cards are also potentially compromised. The method can further comprise instructions for generating a list of all bank cards associated with either the second and/or first merchants, which bank cards are all potentially compromised. This list can be provided to the appropriate financial institutions and legal and/or regulatory authorities such that further action can be taken to prevent fraudulent use thereof. For example, all the listed bank cards can be deactivated, and new bank cards can be issued to replace the deactivated ones, if desired.

APPENDIX A

Exemplary Embodiment of Loader Application Code

```
Private Sub ScanForFiles( )
    For Each file in the inbound directory
        If file ends with .txt Then
            Read the name of the work file
            If file exists in the working directory Then
            Delete workfile
            Move inbound file into working directory
            Call ProcessImportFile(workFile)
            Catch Errors
            Write errors to error log
        End If
    Next
End Sub
Public Sub ProcessImportFile(ByVal workfile As String)
    Open File to for reading
    Read DataLine from workfile
    While Not DataLine Is Nothing
        Get BinNumber from line
        Get FileDate from line
        Get CardNumber from line
        Get TransactionAmount from line
        Get Transaction Date from line
        Get AuthorizationCode from line
        Get MerchantName from line
        Get MerchantAddress from line
        Get MerchantCity from line
        Get Merchant State From line
        Get MerchantZip from line
        Add row to database
            DataLine = file.ReadLine( )
        End While
        Close File
    Update Database
    Write any Errors to the log
End Sub
```

The load application takes the daily feeds from the card processors, extracts specific data, and loads it into the database. This process eliminates a step that would otherwise require a person to manually feed the necessary information into the database.

APPENDIX B

Exemplary Embodiment of a Card Number Lookup Application Code

```
Card Search Screen
Public Class CardSearch
    'Set up some member variables
    Dim mDebitCards As String = ""
    Dim mCreditCards As String = ""
    Dim mAllCards As String = ""
    Dim mCreditBinNumbers As New Collection
    Dim mDebitBinNumbers As New Collection
//Upload card numbers from a file
Sub CardUpload( )
    Browse for file to upload
    Open file for reading
    Dim DataLine As String = t.ReadLine( )
    While Not DataLine Is Nothing
        Get cardno from the first 16 postions
        Get binnumber from first 6 postions of the cardno
        Add cardno to the list box
```

APPENDIX B-continued

Exemplary Embodiment of a Card Number Lookup Application Code

```
            Read next line
        End While
End Sub
//Search for the Common Point of Compromise
Sub CardSearch( )
    Get the card numbers from the list and seperate by type
        Call GetCardNos( )
    Get a total count of bank cards
    If CardCount < 1 Then
        MsgBox("Error: No cards in the list")
        Return
    End If
    Open CardSearchResults Form
    'Send values to results form
    csForm.CreditCards = CreditCards
    csForm.DebitCards = DebitCards
    csForm.AllCards = AllCards
    csForm.CardCount = CardCount
    If CheckBoxAll.Checked Then
        csForm.GetAllData = True
    Else
        csForm.StartDate = DateTimePickerStart.Text
        csForm.EndDate = DateTimePickerEnd.Text
        csForm.GetAllData = False
    end if
End Sub
Private Sub GetCardNos( )
    Create a comma delimited list from the bank cards
    Seperate Debit Cards from Credit Cards
End Sub
Card Search Results Screen
Private Sub GetData(ByVal DebitCards As String, ByVal
CreditCards As String, ByVal AllCards As String, ByVal CardCount
As Integer)
        'Bind the data to the grids
        Dim csr As New CardSearchResults
        'Search Credit Database with all cards
        Call csr.GetCreditData(AllCards, CardCount)
End Sub
Card Search Results Class
    Public Class CardSearchResults
Public Function GetCreditData(ByVal cardnos As String, ByVal
CardCount As Integer, ByVal StartDate As Date, ByVal EndDate As
Date) As Data.DataTable
        Dim sSQL As String
        Select Top 500 merchants that have transaction with a
        cardno in
        the list
        Rank the merchant list by percentage of how many cards
        where used at each merchant.
        End Function
End Class
```

The process of identifying the common point of compromise can be key for a financial institutions to take further steps to stop additional fraud. When known fraud has occurred on bank cards, the card numbers are loaded into a search field. The application can then query the database, identify common strings, and rank them with percentages of commonalties. A date range of usage is also returned. When multiple card processor data is used, a multi step comparison can be made between the data (all data typically does not look the same.) One processor might report with an address and another report by merchant name. The application can compare known merchant names with known addresses and return a common looking result.

APPENDIX C

Exemplary Embodiment of Merchant Name Reverse Lookup Application Code

```
Reverse Lookup Results Screen
Public Class MerchantSearchResultsForm
    Private mGetAllData As Boolean
    Private mStartDate As Date
    Private mEndDate As Date
    Private mMerchantName As String
    Private mMerchantAddress As String
    Private Sub GetData(byval MerchantName)
        Get all of the bank cards that have been used at a given
merchant
        Filter Results by date range parameters
        Return results to caller
    End If
    End Sub
    Public Sub LoadData(By val MerchantName)
        Call    GetData(MerchantName)
        End If
    End Sub
End Class
```

This application can compare known merchant names with known addresses and return a common looking result.

APPENDIX D

Exemplary Embodiment of Merchant Frequency Application Code

```
Merchant Frequency Results Screen
Private Sub GetData( )
    Get the average number of daily transactions for all
merchants
    Get all merchants who have a transaction count greater than
the daily average
    Return the merchants whose daily average is greater than
the threshold percentage
End Sub
Public Sub LoadData( )
    Call GetData(byVal MerchantName)
End Sub
```

Often, a criminal will test stolen credit and debit cards by making a charge with a particular merchant and then reversing the transaction. The charge never hits the cardholders' statement, due to the immediate reversal. However, by performing a merchant frequency examination as per the preceding application code, for example, it is possible to identify a merchant breach and the at risk cards that were used at the compromised merchant. As described herein, this can be done by entering a percent increase in reported daily authorizations that an end user wants to analyze. A test site will typically show large increases in daily authorizations. The bank cards being tested can then be loaded into the application and used to identify a common point of compromise, as previously described more fully. The merchant name reverse lookup can then be used to identify all at risk cards. All of this can be done before the perpetrator actually uses the card to make fraudulent purchases or withdraws.

Accordingly, it is to be understood that what has been described above comprises exemplary embodiments of bank card fraud detection and/or prevention methods. It is of course not possible to describe every conceivable combination of components or methodologies for implementing the contemplated bank card fraud detection and/or prevention methods. However, one of ordinary skill in the art may recognize that many further combinations and permutations are possible in light of the overall teaching of this disclosure. Therefore, the bank card fraud detection and/or prevention methods described herein are intended to be illustrative only, and should be considered to embrace any alterations, modifications and variations that fall within the spirit and scope of the appended claims. Also, the term "includes," if and to the extent used herein, is intended to be inclusive, similarly to the term "comprising" as that term is interpreted as a transitional word in a claim.

What is claimed is:

1. A bank card fraud detection and/or prevention method comprising:
   a. identifying, using a computer, a test site comprising a first merchant associated with bank card transaction frequencies which exceed a predetermined threshold value indicative of potentially fraudulent bank card activity, said predetermined threshold value a percentage of all bank card transactions over a predetermined time interval;
   b. identifying, using the computer, a first plurality of bank cards used at said first merchant associated with said transaction frequencies which exceed said threshold value;
   c. from said first plurality of bank cards used at said first merchant, identifying, using the computer, a second plurality of bank cards which have reversals of charges made at said first merchant before said charges get to posting files such that said charges do not appear on cardholder statements, said reversals of said charges as made such that said charges do not appear on said cardholder statements indicating at least some of said second plurality of bank cards are fraudulent and were being tested at said first merchant to determine if said second plurality of bank cards worked; and
   d. from said second plurality of bank cards, determining, using the computer, a common point of compromise, wherein said common point of compromise is a second merchant at which at least some of said second plurality of bank cards were used.

2. The method of claim 1 further comprising identifying, using the computer, other bank cards used at said second merchant, wherein said other bank cards are potentially compromised.

3. The method of claim 1 wherein said identifying bank card transaction frequencies which exceed a predetermined threshold value further comprises searching, using the computer, a bank card database using a bank card transaction frequency query.

4. The method of claim 3 wherein said bank card transaction frequency query is based upon exceeding said threshold value over said predetermined time interval.

5. The method of claim 4 wherein said time interval is a single day.

6. The method of claim 5 wherein said transaction frequency is one percent of all bank card transactions during said single day.

7. The method of claim 1 wherein said identifying said bank cards used at said first merchant identified as being associated with said transaction frequencies which exceed said threshold value further comprises searching, using the computer, a bank card database based upon said first merchant to identify bank cards which were used at said first merchant.

8. The method of claim 1 further comprising providing, using the computer, a list of said potentially compromised bank cards.

9. The method of claim 8 further comprising deactivating, using the computer, the bank cards on said list of potentially compromised bank cards.

10. The method of claim 9 further comprising issuing, using the computer, new bank cards to replace the deactivated ones.

11. A non-transitory computer-readable medium having computer-executable instructions, to be executed by a computer, for performing a bank card fraud detection and/or prevention method comprising:
    a. searching a bank card database using a bank card transaction frequency query to identify a test site comprising a first merchant associated with bank card transaction frequencies which exceed a predetermined threshold value which is indicative of potentially fraudulent bank card activity, said predetermined threshold value a percentage of all bank card transactions over a predetermined time interval;
    b. searching the bank card database using a query based upon said first merchant to identify a first plurality of bank cards used at said first merchant;
    c. from said first plurality of bank cards, identifying a second plurality of bank cards which have charge reversals that are made at said first merchant before said charges get to posting files such that said charges do not appear on cardholder statements, said reversals of said charges as made such that said charges do not appear on said cardholder statements indicating at least some of said second plurality of bank cards are fraudulent and were being tested at said first merchant to determine if said second plurality of bank cards worked; and
    d. searching the bank card database using a query based upon said second plurality of bank cards to determine a common point of compromise, wherein said common point of compromise is a second merchant at which at least some of said second plurality of bank cards were used.

12. The non-transitory computer-readable medium of claim 11 further comprising:
    a. searching the bank card database using a query based upon said second merchant; and
    b. identifying other bank cards used at said second merchant, wherein such other bank cards are potentially compromised.

13. The non-transitory computer-readable medium of claim 11 wherein said bank card transaction frequency query is based upon exceeding said threshold value over said predetermined time interval.

14. The non-transitory computer-readable medium of claim 13 wherein said time interval is a single day.

15. The non-transitory computer-readable medium of claim 14 wherein said transaction frequency is one percent of all bank card transactions during said single day.

16. The non-transitory computer readable medium of claim 11 further comprising instructions for generating a list of all bank cards associated with at least one of said first and second merchants, which bank cards are all potentially compromised.

17. The non-transitory computer readable medium of claim 16 further comprising instructions for deactivating the bank cards on said list, or noting that such cards are to be deactivated.

18. The non-transitory computer readable medium of claim 17 further comprising instructions for issuing new bank cards to replace the deactivated ones, or noting that replacement cards are to be issued.

* * * * *